June 23, 1942.  H. H. LOGAN  2,287,046
LATHE DRIVE MECHANISM
Filed March 13, 1941  4 Sheets-Sheet 3

Inventor
Henry H. Logan,
By McCaleb and Wendt
Attorneys.

June 23, 1942.   H. H. LOGAN   2,287,046
LATHE DRIVE MECHANISM
Filed March 13, 1941   4 Sheets-Sheet 4

Inventor:
Henry H. Logan,
By McCabe and Hunt
Attorneys.

Patented June 23, 1942

2,287,046

UNITED STATES PATENT OFFICE 2,287,046

LATHE DRIVE MECHANISM

Henry H. Logan, Chicago, Ill., assignor to Logan Engineering Co., Chicago, Ill., a corporation of Illinois Application March 13, 1941, Serial No. 383,070

13 Claims. (Cl. 74—217)

The present invention relates to machine drives, and is particularly concerned with facilities for the driving of machine tools such as lathes by means of electric motors.

Small motor driven machines such as lathes, shapers, milling machines, and the like, are now being used in large and rapidly increasing numbers, both by industry, and by individuals in work shops located in the individuals' homes.

The provision of suitable motor drives for such machines has in the past presented a difficult problem, due to the fact that the motor drives usually employed for driving such smaller machines have caused vibration to be set up in the driven machines which adversely affected the work performed by such machines.

The small inexpensive motors frequently selected for driving machines of this class are usually not balanced to the same degree as more expensive motors, with the result that the motors are apt to vibrate. Since the motors are relatively heavy in proportion to the weight of the driven machines such vibrations are transmitted to the driven machines when employing customary types of motor drive arrangements.

Most machines of the class referred to are provided with a change speed arrangement consisting of a pair of step or cone pulleys, one of which is secured to the spindle of the driven machine, and the other of which is secured to a countershaft, so that a change in driving ratio may be accomplished by the shifting of a belt on the cone pulleys. Since the operators of these machines are frequently not highly skilled, the shifting of the belt, in its normal driving condition of tautness, involves some danger to the operator, and frequently causes abrasion of the edges of the belt. By loosening the drive belt on the cone pulleys before attempting to shift the belt, the danger to the operator, and abrasion of the belt would be greatly reduced. Such loosening of the belt in the case of drive mechanisms heretofore used has usually been considered impractical, since in the first place no ready means for loosening the belt has been provided, and in the second place it is difficult to restore the belt to its proper driving tension.

An object of the present invention is to provide improved motor drive facilities for machinery.

Another object is to provide a cushioned motor drive mechanism to have bracing support from a driven machine with which the drive mechanism is associated, and to have principal support independently of the driven machine.

Another object is to drive a small lathe or the like by means of a cushioned drive mechanism attached to the lathe, and independently supported with respect to said lathe.

Another object is to provide a motor drive mechanism with a three point support, two points of said support being adapted for cushioned connection with a driven machine, and the third point of support located substantially under the center of gravity of the drive mechanism, and having support independently of the driven machine.

Another object is to enclose a machine drive mechanism with a weighted closure member interconnected with a belt tautening portion of said belt drive mechanism, to tauten a driving belt by the weight of said closure member.

Another object is to mount a lathe drive mechanism on a lathe, with a major portion of the weight of said drive mechanism independently supported with respect to said lathe, and having balanced drive connection with said lathe to prevent distorting strain on the lathe.

Other objects and advantages of the invention will be apparent from the following description and the accompanying drawings in which similar characters of reference indicate similar parts throughout the several views.

Referring to the drawings, of which there are four sheets,

Fig. 5 is an enlarged fragmentary sectional view of a modified type of mounting pintle, the section being similar to that of Fig. 3; and, Fig. 6 is a view in end elevation of a bench lathe mounted on a bench and having a modified type of drive mechanism, the lower portion of the bench being broken away.

Figure 1:
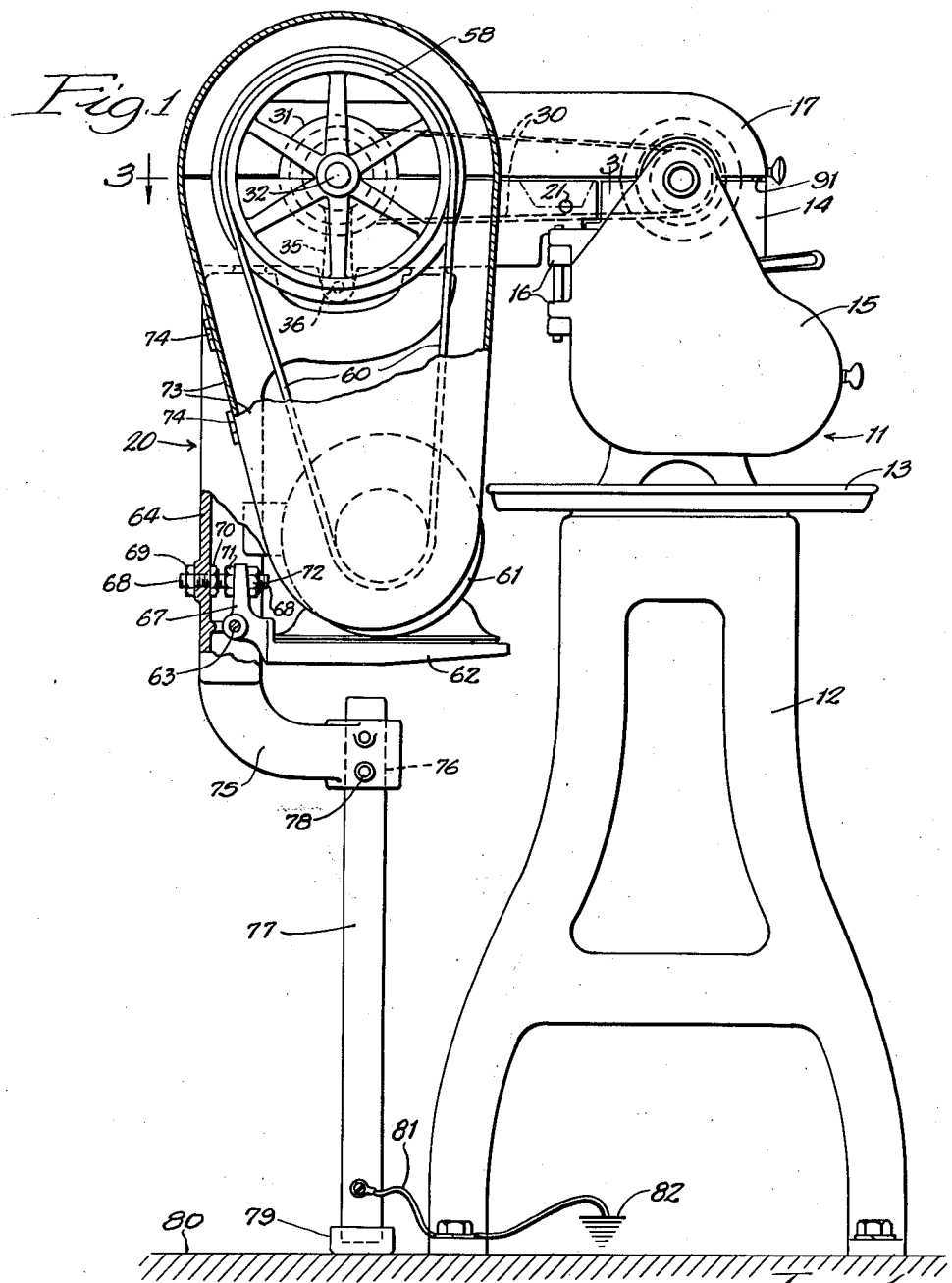
Fig. 1 is a view in end elevation of a lathe having a drive unit embodying the present invention, portions thereof being broken away to show the interior construction.
Figure 2:
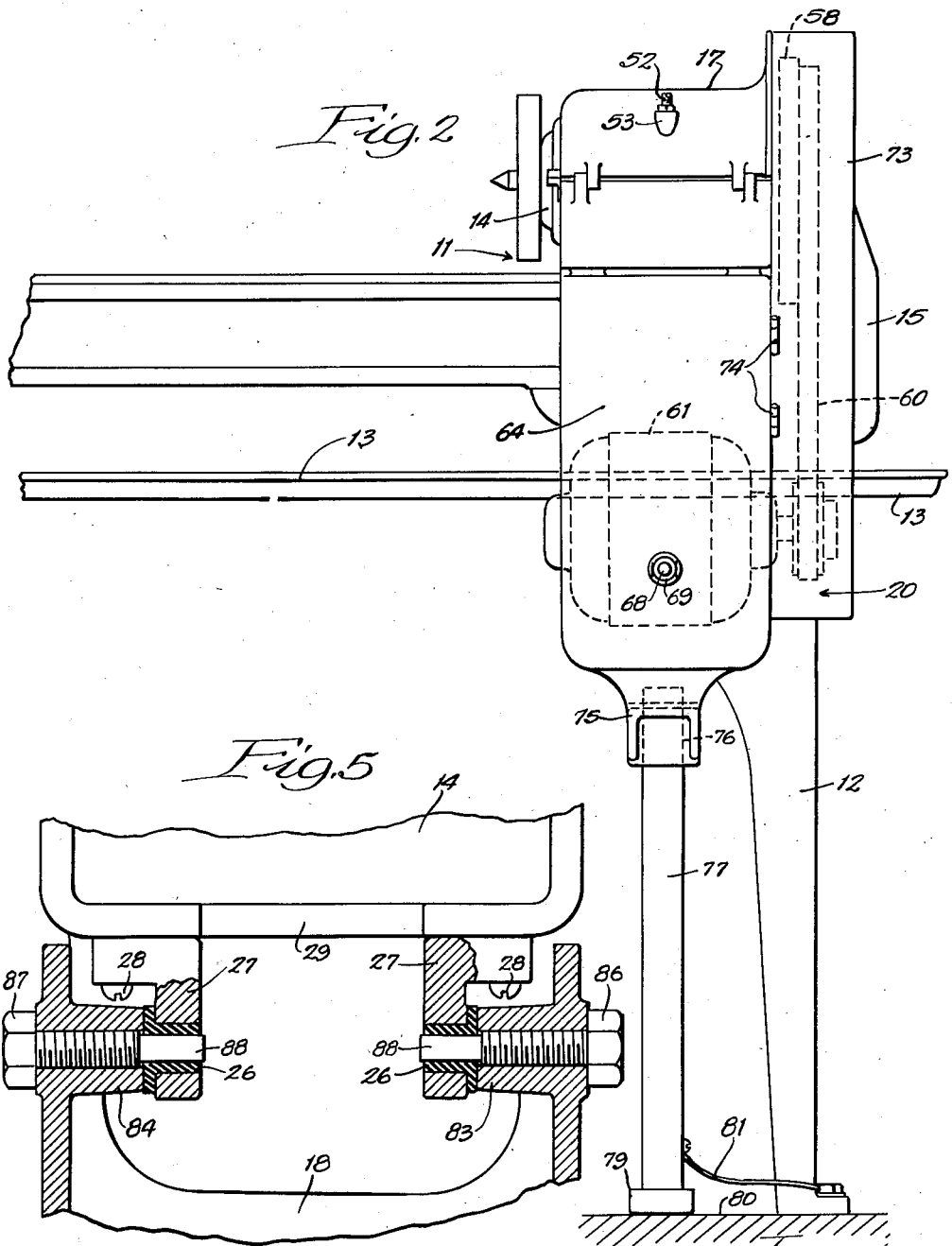
Fig. 2 is a fragmentary rear elevational view of the lathe and associated drive mechanism illustrated in Fig. 1, the left hand end of the lathe as illustrated, being broken away.

Referring to the embodiment illustrated in Figs. 1 to 4, inclusive, a lathe 11 is provided with supporting legs 12, chip pan 13, and headstock

14. A conventional gear cover 15, used to cover the lead-screw drive gears, not illustrated, is mounted on a conventional hinge 16. The top of the housing of the headstock is open as best illustrated in Fig. 3, and is adapted to be closed by a cover 17, which is hinged at its rear end, to the head frame 18 of a lathe drive mechanism generally indicated by the numeral 20.

The head frame member 18 is attached to the lathe 11 by means of a pair of pintles 21 and 22, which are secured in bosses 23 and 24 respectively, projecting inwardly from the sides of the head frame 18. The pintles are secured in position as by means of set screws 25. Each of the pintles is provided with a rubber bushing 26, the rubber bushings being in turn mounted in openings in a pair of brackets 27 secured to the rear of the housing of the lathe headstock 14 by machine screws 28.

Figure 3:
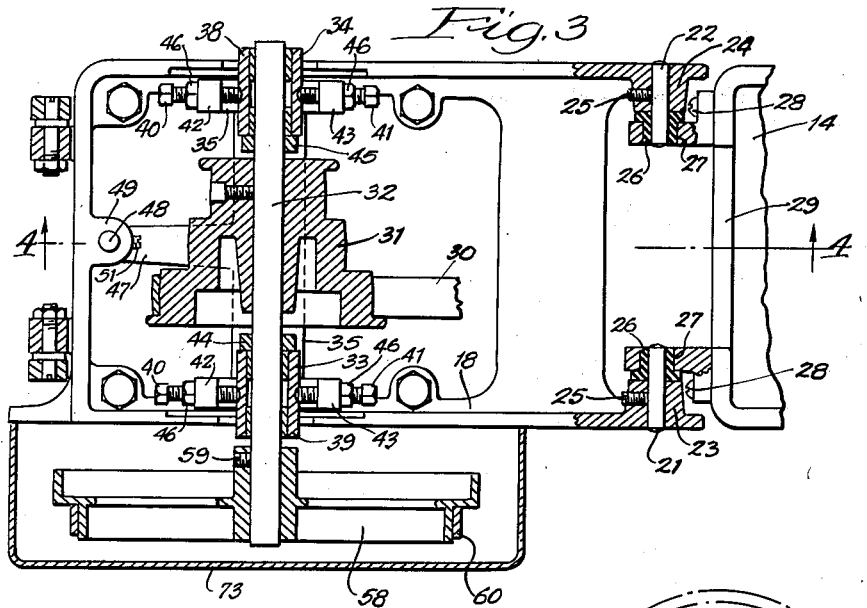
Fig. 3 is an enlarged fragmentary sectional view taken on the offset planes of the broken line 3—3 of Fig. 1, the lathe headstock being broken away.
Figure 4:
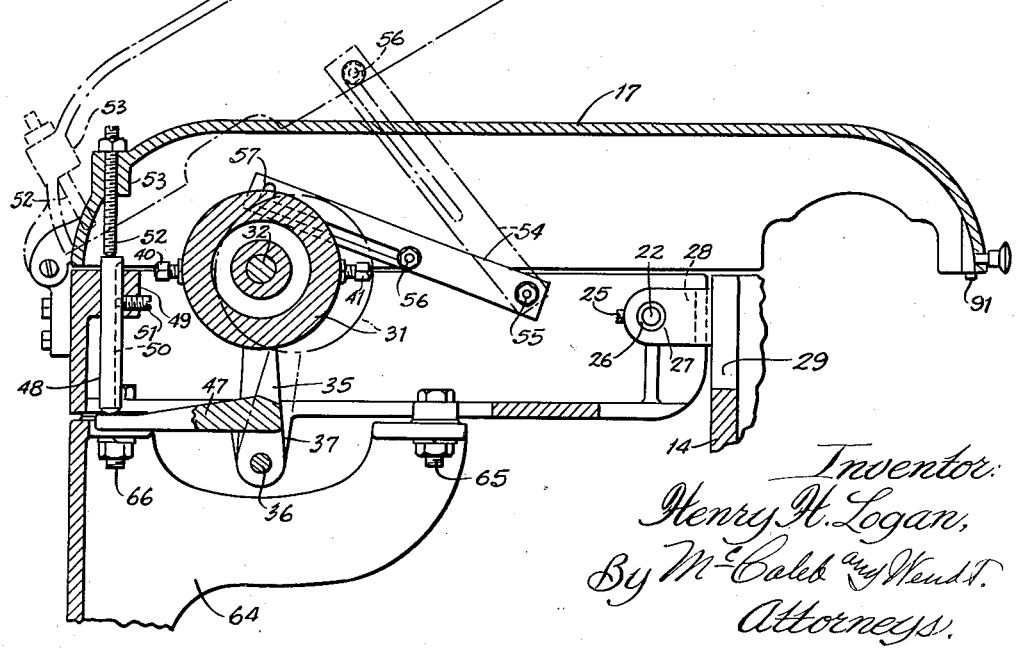
Fig. 4 is a vertical fragmentary sectional view of the upper portion only of the lathe drive mechanism taken on the plane of the line 4—4 of Fig. 3.

The housing of the headstock 14 is notched out as at 29, see Figs. 3 and 4, to provide clearance for a drive belt 30 which is driven by a cone pulley 31 secured to a countershaft 32. The countershaft 32 is journaled in bearings 33 and 34 carried by a yoke 35 which comprises part of an automatic belt tension control.

The yoke 35 is arranged to swing the cone pulley 31 toward a similar cone pulley, not illustrated, carried on the lathe spindle in a conventional manner, so as to loosen the belt 30 when the cover 17 is raised to the open or dotted line position illustrated in Fig. 4, and to tauten the belt when the cover 17 is moved to the closed solid line position illustrated in Fig. 4.

Figure 6:
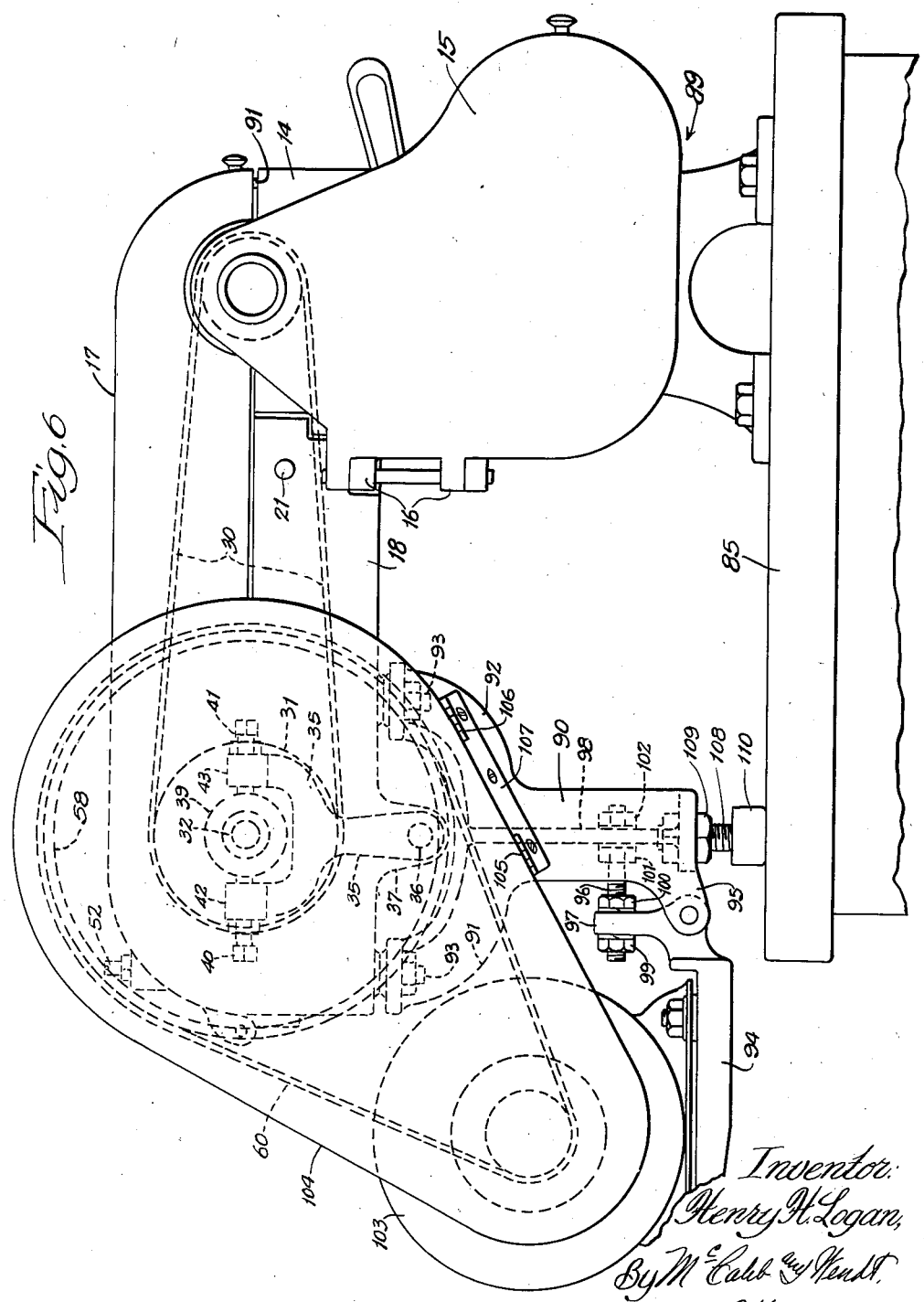

The yoke 35 is pivotally mounted on a rod 36 which is carried in brackets 37 projecting downwardly from the head frame 18, see Figs. 4 and 6. The countershaft 32 is journaled in bearings 38 and 39, as illustrated in Fig. 3, the bearings being secured between oppositely disposed set screws 40 and 41, which are threaded through bosses 42 and 43 at the upper end of each of the forked side portions of the yoke 35. Each of the set screws 40 and 41 is provided with a lock nut 46. The countershaft 32 is retained against longitudinal movement in the bearings 33 and 34 by collars 44 and 45 which are secured to the countershaft 32 inside of each of the bearings 33 and 34 respectively.

The yoke 35 has an integral rearwardly projecting arm 47, which is positioned beneath a pin 48 slidably mounted in a boss 49 of the head frame 18. The pin 48 may have a longitudinal key-way 50 extending slightly less than the full length of the pin 48, a stud 51 being threaded into the boss 49 to have a reduced nose portion of said stud riding in the key-way 50 to limit the sliding movement of the pin 48.

A belt tension adjusting screw 52 is threaded through a boss 53 in the cover 17, see Fig. 3, so that when the cover is in the closed position shown in solid lines in Fig. 4, the screw 52 forces the sliding pin 48 downwardly, thereby exerting a downward pressure on the rearward or free end of the arm 47. This action pivotally urges the yoke 35 in a counter-clockwise direction, as from the dotted to the solid line position of Fig. 4, and thereby exerts a tautening influence on the belt 30.

When the cover is raised to the dotted line position of Fig. 4, the sliding pin 48 is released by the screw 52, whereupon the yoke 35 is free for clockwise pivotal movement as to the dotted line position of Fig. 4, to relieve the tension on the belt 30. When the tension on the belt 30 is thus relieved, the shifting of the belt on the cone pulleys may be easily and safely performed without danger to the operator or damage to the belt.

A self-latching cover link 54 is pivoted at 55 to the side of the head frame 18, and is provided with a slot 55 in which a stud 56, secured to the cover 17, is adapted to ride. In the closed position of the cover 17, the stud 56 is at the inward end of the slot 55, and when the cover is moved to the open, dotted line, position of Fig. 4, the stud 56 moves outwardly in the slot 55. When the stud 56 reaches the outer end of the slot 55, the weight of the link 54 moves the link downwardly to bring the stud 56 into the angularly offset outer end portion 57 of the slot 55 to latch the cover in the raised position. The link 54 may be released for lowering the cover by manually moving the link upwardly to again bring the stud 56 into the main straight portion of the slot 55. A pair of rubber pads 91 are mounted to project below the lower edge of the cover 17, see Fig. 5, to rest on the upper edge of the housing of the headstock 14 to form a resilient support for the front edge of the cover.

A belt driven pulley 58 is secured to the outer end of the countershaft 32, as illustrated in Fig. 4, by means of a set screw 59, the pulley 58 being driven as by means of a belt 60 from an electric motor 61.

The motor 61 is mounted on a motor support bracket 62 which is pivotally connected as at 63 to a support frame 64. The support frame 64 is secured to the head frame 18 as by means of bolts 65 and 66, see Fig. 4, the support frame 64 being preferably of cast iron so as to have sufficient mass and rigidity to absorb minor vibrations which might otherwise be set up by the action of the motor and belts.

The motor support bracket 62 is formed with an upwardly extending adjusting arm 67, see Fig. 1, which is provided with an opening to receive a bolt 68. The bolt 68 extends through the wall of the support frame 64 and is provided with a plurality of nuts 69, 70, 71 and 72 by means of which the position of the motor support bracket 62 can be pivotally adjusted to regulate the tension on the belt 60.

A sheet metal belt shield 73 is hinged as at 74 to the support frame 64 to provide a safety enclosure for the belt 60 and associated parts.

The lower end of the support frame 64 is curved inwardly as at 75, and is provided with a vertically extending opening 76 located approximately beneath the center of gravity of the drive mechanism 20. A tubular supporting leg 77 is secured in adjusted position in the opening 76 as by means of set screws 78. The lower end of the tubular support 77 is provided with a resilient rubber cap 79 to absorb minor vibrations, and to prevent transmitting vibrations to a supporting floor 80.

A ground wire 81 may be secured to the supporting leg 77 and to the leg 12 of the lathe. The leg 12 is in turn electrically connected to a suitable ground indicated diagrammatically at 82 in order to ground any static charge or any current which might be conducted to the lathe or drive frame as by means of a possible short circuit.

In Fig. 5 is illustrated a modified pintle construction for connecting the lathe drive mechanism to the headstock. In the construction illustrated in Fig. 5, the housing of the headstock 14 is provided with brackets 27 similar to those illustrated in Fig. 3, and with the same type of rubber bushings 26 inserted in the openings in the brackets 27. The head frame 18 is formed with inwardly extending bosses 83 and 84. The bosses 83 and 84 have internally threaded openings into which are screwed pintle bolts 86 and 87, respectively. The pintle bolts have unthreaded inner ends 88 of reduced diameter to enter the rubber bushings 26.

A modified type of drive mechanism is illustrated in Fig. 6. This drive mechanism is particularly adapted for the driving of bench lathes of the type indicated generally by the numeral 89, the lathe being illustrated as mounted upon a bench 85.

Since the lathe itself, except for the absence of the chip pan and legs, and the entire head frame 18 and its parts are substantially the same as those illustrated in Figs. 1 to 4, inclusive, it will be unnecessary to again describe the lathe and the upper parts of the drive mechanism in detail. These parts in Fig. 6 are therefore given the same numbers as the corresponding parts in the illustrations of Figs. 1 to 4, inclusive.

A lower support frame 90 has a divided upper end consisting of arms 91 and 92 which are provided with openings positioned to register with the openings in the head frame 18 to receive bolts 93 which secure the support frame 90 to the head frame 18.

A motor support bracket 94 is pivoted between a pair of arms 95 extending rearwardly from the lower portion of the support frame 90. The bracket 94 is retained in pivotal adjustment by means of a bolt 96 which is inserted through an opening in an upwardly extending arm 97 integral with the bracket 94, the bolt 96 also extending through a transverse web portion 98 of the support frame 90. Pivotal adjustment of the bracket 94 is accomplished by means of nuts 99, 100, 101 and 102 threaded onto the bolt 96 as illustrated.

A motor 103 is bolted to the support bracket 94 and is arranged to drive a belt which may be considered as being the same belt 60 as that illustrated in Figs. 1 to 4, inclusive. A sheet metal belt guard 104 is mounted on hinges 105 and 106 carried by a bracket 107 which is secured to the support frame 90.

A threaded support leg 108 is screwed into the base of the frame 90 at the approximate center thereof, and is locked in adjusted position by means of a lock nut 109. A rubber cap 110 forms a cushioned support for the leg 108 and acts to absorb minor vibrations which otherwise might be transferred to the bench 85.

If desired, the type of drive unit illustrated in Fig. 6 may be used in the manner of the drive unit illustrated in Figs. 1 to 4, inclusive, by substituting for the leg 108 a leg sufficiently long to extend entirely to the floor. When thus used, the modified mechanism illustrated in Fig. 6 may be used where a less expensive drive mechanism than that illustrated in Figs. 1 to 4, inclusive, is desired, and at the same time secure the advantages of a drive mechanism embodying the present invention.

While the drive mechanism is illustrated as being adapted for use with a lathe having a headstock shaped to cooperate with the cover of the drive mechanism, the drive mechanism can be adapted for use with other types of lathes and machine tools as will be clearly apparent to those skilled in the art.

The present drive mechanism provides a simple, safe, and positive drive for a small lathe or machine tool and one which is readily adapted for attachment to practically any such machine. The safety features including the automatic belt tension control give automatic protection to the operator during a belt shifting operation or other operation which requires the raising of the cover 17. This feature also greatly simplifies such belt shifting operation, as well as adding materially to the life of the belt.

The cushioned weight of the drive mechanism being mainly carried by the single leg insures against any twisting or other strains even when mounted on a rough or uneven floor, while the cushioned connection to the lathe absorbs any minor vibrations, such as motor vibrations, which otherwise might be transmitted to the lathe.

While I have illustrated a preferred embodiment of my invention, many modifications may be made without departing from the spirit of the invention, and I do not wish to be limited to the precise details of construction as set forth, but desire to avail myself of all changes within the scope of the appended claims.

Having thus described my invention, what I claim as new and desire to secure by Letters Patent of the United States is:

1. A drive mechanism comprising in combination with a driven machine having a driven pulley thereon, a drive mechanism frame mounted at a side of said driven machine, a single point support beneath the frame independent of the driven machine, a countershaft journaled in the frame, a thrust connection between the frame and the driven machine, a driving pulley mounted on the countershaft opposite the driven pulley on the driven machine, a belt mounted around the countershaft driving pulley and the driven pulley on the machine, the two reaches of the belt lying on opposite sides of a horizontal line through the thrust connection, and a driving motor mounted on said frame and having driving connection with said countershaft.

2. A drive mechanism comprising in combination with a driven machine having a driven pulley thereon, a frame mounted at a side of the driven machine, a driving pulley mounted on said frame and spaced laterally from said driven pulley, a drive belt connecting the driving pulley to the driven pulley on the driven machine, a motor, driving connection between the motor and the driving pulley, two point cushioned thrust connection between the driving pulley and the driven machine to hold the drive belt in tension, the thrust connection lying vertically adjacent the median line of tension of said drive belt the points of cushioned connection being located on opposite sides of the plane of the belt, and a single leg support mounted beneath said frame and independent of the driven machine substantially to support the drive mechanism.

3. A drive mechanism comprising in combination with a driven machine having a driven pulley thereon, a drive mechanism frame, a single point support beneath the frame, a pair of laterally spaced thrust connections between the frame and the driven machine, said connections constituting the sole thrust connection between the frame and the driven machine, a yoke pivotally mounted in the frame, a pulley journaled on the yoke, a motor mounted on the frame and having driving connection with the pulley journaled in the yoke, a belt mounted around the pulley journaled on the yoke and the driven pulley on the driven machine, a cover hinged to the frame to enclose at least partially the pulley journaled on the yoke, and belt tightening means carried by the cover and positioned to engage a yoke element on a closing movement of the cover to move the driven pulley mounted in the yoke to increase the tension on the belt.

4. A drive mechanism comprising in combination with a driven machine having a driven pulley thereon, a drive mechanism frame, a single point support beneath the frame, a movable countershaft support, a countershaft journaled in the support, a pair of cushioned pivot connections between the frame and the driven machine, a driving pulley mounted on the countershaft opposite the driven pulley on the driven machine, a belt mounted around the countershaft driving pulley and the driven pulley on the machine to lie in a vertical plane, located wholly between the cushioned pivot connections, the countershaft support having a normal position releasing the tension on the belt, a hinged cover mounted to enclose, at least partially, the belt and the driving and driven pulleys, and means connecting the cover and the countershaft support as the cover is moved about its hinge toward closed position to move the countershaft support to separate the pulleys surrounded by the belt, thereby to increase the tension on said belt.

5. A drive mechanism comprising in combination with a driven machine having a driven pulley thereon, a drive mechanism frame, a single point support beneath the frame, a countershaft support movably mounted in the frame, a countershaft journaled in the countershaft support, a driving pulley mounted on the countershaft opposite the driven pulley on the driven machine, a belt mounted around the countershaft driving pulley and the driven pulley on the machine, a cover of substantial weight pivotally connected to the frame, and adapted to enclose at least part of the belt and the pulleys around which it is mounted, a belt tightening thrust member adjustably mounted on the cover and positioned operatively to engage the movable countershaft support on a release of the cover to a closed position to move the countershaft supported pulley to an adjusted belt tensioning position.

6. A driving mechanism comprising in combination with a driven machine having a driven pulley thereon, a drive mechanism frame connected to the driven machine to extend laterally from the portion thereof having the driven pulley thereon, a countershaft support movably mounted in the frame, a countershaft carried by the support to be movable toward and away from the driven pulley, a driving pulley mounted on the countershaft opposite the driven pulley on the driven machine, a belt mounted around the countershaft driving pulley and the driven pulley on the machine, a cover of substantial weight pivotally connected to the frame to over-lie at least partially the belt and the pulleys around which it passes, an adjustable thrust member carried by the cover, and thrust responsive means operatively associated with the movable countershaft support, said thrust responsive means being positioned to be engaged by the adjustable thrust member carried by the cover as the cover is moved to closed position, to move the countershaft away from the driven pulley to produce a predetermined increase in tension on said belt.

7. A drive mechanism for a driven machine, having a frame and a driven pulley thereon, said drive mechanism including a frame, a single point support beneath the frame, a pair of laterally spaced thrust connections between the frame and the driven machine, said connections constituting the sole thrust connection between the drive mechanism frame and the driven machine, a yoke pivotally mounted in the drive mechanism frame, a pulley journaled on the yoke, a motor mounted on the frame and having driving connection with the pulley journaled on the yoke, a belt mounted around the pulley journaled on the yoke and the driven pulley on the driven machine, and belt tightening means mounted to engage a yoke element on a predetermined movement of said belt tightening means to increase the tension on the belt.

8. A drive mechanism comprising in combination with a driven machine having a driven pulley thereon, a drive mechanism frame, a single point support beneath the frame, a movable countershaft support, a countershaft journaled in the support, a thrust connection between the frame and the driven machine, a driving pulley mounted on the countershaft laterally opposite the driven pulley on the driven machine, and movable toward and away from the driven pulley, a belt mounted around the countershaft driving pulley and a driven pulley, the countershaft support having a normal position releasing the tension on the belt, and means mounted to move the countershaft support away from the driven pulley, thereby to increase the tension on said belt.

9. A drive mechanism comprising in combination with a driven machine having a driven pulley thereon, a drive mechanism frame, a single point support beneath the frame to support substantially the entire weight of said drive mechanism, a countershaft support pivoted on said frame, a countershaft journaled in said countershaft support eccentrically to the pivot of said countershaft support, a thrust connection between the frame and the driven machine, said thrust connection being substantially free from weight of the drive mechanism, a motor mounted with its shaft beneath the countershaft and having driving connection with the countershaft, said motor having pivotal connection with the frame laterally from said motor shaft, and means independent of the driving connection between the motor shaft and the countershaft to limit the downward displacement of the motor about its pivotal support.

10. A drive mechanism comprising in combination with a driven machine having a driven pulley thereon, a drive mechanism frame mounted at a side of said driven machine, a support beneath the frame independent of the driven machine, a countershaft journaled in the frame, a thrust connection between the frame and the driven machine, a driving pulley mounted on the countershaft opposite the driven pulley on the driven machine, a belt mounted around the countershaft driving pulley and the driven pulley on the machine, the two reaches of the belt lying on opposite sides of a horizontal line through the thrust connection, and a driving motor mounted on said frame and having driving connection with said countershaft.

11. A drive mechanism comprising in combination with a driven machine having a driven pulley thereon, a drive mechanism frame, a support beneath the frame, a pair of laterally spaced thrust connections between the frame and the driven machine, said connections constituting the sole thrust connection between the frame and the driven machine, a yoke pivotally mounted in the frame, a pulley journaled on the yoke, a motor mounted on the frame and having driving connection with the pulley journaled on the yoke, a belt mounted around the pulley journaled on the yoke and the driven pulley on the driven machine, a cover hinged to the frame to enclose at least partially the pulley journaled on the yoke, and belt tightening means carried by the cover and positioned to engage a yoke element on a closing movement of the cover to move the driven pulley mounted in the yoke to increase the tension on the belt.

12. A drive mechanism comprising in combination with a driven machine having a driven pulley thereon, a drive mechanism frame, a support beneath the frame, a movable countershaft support, a countershaft journaled in the support, a pair of cushioned pivot connections between the frame and the driven machine, a driving pulley mounted on the countershaft opposite the driven pulley on the driven machine, a belt mounted around the countershaft driving pulley and the driven pulley on the machine to lie in a vertical plane, located wholly between the cushioned pivot connections, the countershaft support having a normal position releasing the tension on the belt, a hinged cover mounted to enclose, at least partially, the belt and the driving and driven pulleys, and means connecting the cover and the countershaft support as the cover is moved about its hinge toward closed position to move the countershaft support to separate the pulleys surrounded by the belt, thereby to increase the tension on said belt.

13. A drive mechanism comprising in combination with a driven machine having a driven pulley thereon, a drive mechanism frame, a support beneath the frame, a movable countershaft support, a countershaft journaled in the support, a thrust connection between the frame and the driven machine, a driving pulley mounted on the countershaft laterally opposite the driven pulley on the driven machine, and movable toward and away from the driven pulley, a belt mounted around the countershaft driving pulley and a driven pulley, the countershaft support having a normal position releasing the tension on the belt, and means mounted to move the countershaft support away from the driven pulley, thereby to increase the tension on said belt.

HENRY H. LOGAN.